(12) United States Patent
Park et al.

(10) Patent No.: US 12,360,072 B2
(45) Date of Patent: Jul. 15, 2025

(54) PH MONITORING SYSTEMS HAVING SENSOR MODULES

(71) Applicant: Samsung Electronics Co., Ltd., Suwon-si (KR)

(72) Inventors: Sunhwan Park, Hwaseong-si (KR); Jaeo Ryu, Suwon-si (KR); Jungsoo Son, Suwon-si (KR); Kyoungok Kim, Ansan-si (KR); Wonhee Park, Hwaseong-si (KR); Jiho Uh, Seoul (KR); Hyunsoo Chun, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 283 days.

(21) Appl. No.: 17/962,902

(22) Filed: Oct. 10, 2022

(65) Prior Publication Data
US 2023/0296550 A1 Sep. 21, 2023

(30) Foreign Application Priority Data
Mar. 17, 2022 (KR) ................. 10-2022-0033193

(51) Int. Cl.
*G01N 27/30* (2006.01)
*G01N 1/20* (2006.01)

(52) U.S. Cl.
CPC ......... *G01N 27/302* (2013.01); *G01N 1/2035* (2013.01); *G01N 2001/205* (2013.01)

(58) Field of Classification Search
CPC ............... G01N 27/302; G01N 1/2035; G01N 2001/205; G01N 27/283; H01L 21/67253; H01L 21/67017
See application file for complete search history.

(56) References Cited

U.S. PATENT DOCUMENTS

| 9,267,833 B2 | 2/2016 | Ohmiya et al. |
| 9,868,930 B2 | 1/2018 | Adkins et al. |
| 2021/0356418 A1 | 11/2021 | Vu et al. |
| 2022/0018802 A1* | 1/2022 | Shiokawa ............ G01N 27/416 |

FOREIGN PATENT DOCUMENTS

| CN | 214408784 U | * 10/2021 | ............. G01N 27/30 |
| JP | 2002-005873 A | 1/2002 | |
| JP | 3633077 B2 | 3/2005 | |
| KR | 102248985 B1 | 5/2021 | |
| KR | 10-2021-0091253 A | 7/2021 | |

* cited by examiner

*Primary Examiner* — Timothy P Graves
(74) *Attorney, Agent, or Firm* — Harness, Dickey & Pierce, P.L.C.

(57) ABSTRACT

A pH monitoring system includes a first pipe, and a second pipe and a third pipe each branched from the first pipe, a drain connected to the third pipe, a sensor module connected to the second pipe, the sensor module including an inlet valve connected to the second pipe, an outlet valve connected to the drain, and a chamber configured to receive a chemical liquid therein, and a pH sensor mountable to the sensor housing. The sensor module is disposed in parallel to the third pipe.

19 Claims, 10 Drawing Sheets

PH MONITORING SYSTEMS HAVING SENSOR MODULES

CROSS-REFERENCE TO THE RELATED APPLICATION

This application claims priority from Korean Patent Application No. 10-2022-0033193, filed on Mar. 17, 2022, in the Korean Intellectual Property Office, the disclosure of which is incorporated herein by reference in its entirety.

BACKGROUND

1. Field

The example embodiments of the disclosure relate to a pH monitoring system including a sensor module.

2. Description of the Related Art

In a process of manufacturing a substrate, a liquid processing process is performed by supplying various chemical liquids. For supply of the chemical liquids, liquid supply equipment is used. For checking of the liquid supply equipment, technology for safely performing pH measurement without scattering a chemical liquid of strong acid or strong base is desirable.

SUMMARY

The example embodiments of the disclosure provide a pH monitoring system including a sensor module disposed in parallel to a pipe connected to a drain.

A pH monitoring system according to some example embodiments of the disclosure may include a first pipe, a second pipe and a third pipe branched from the first pipe, a drain connected to the third pipe, a sensor module connected to the second pipe, the sensor module including an inlet valve connected to the second pipe, an outlet valve connected to the drain, and a sensor housing including a chamber configured to receive a chemical liquid therein, and a pH sensor releasably mounted to the sensor housing. The sensor module may be disposed in parallel to the third pipe.

A pH monitoring system according to some example embodiments of the disclosure may include at least one chemical liquid supply source, a mixer connected to the chemical liquid supply source, a pump connected to the mixer, a substrate processing apparatus connected to the pump, a first pipe connected to the pump, a second pipe and a third pipe branched from the first pipe, a drain connected to the third pipe, a first sensor module connected to the second pipe, the first sensor module including an inlet valve connected to the second pipe, an outlet valve connected to the drain, and a sensor housing including a chamber configured to receive a chemical liquid therein, and a pH sensor releasably mounted to the sensor housing. The first sensor module may be disposed in parallel to the third pipe.

A pH monitoring system according to some example embodiments of the disclosure may include a first pipe, a second pipe and a third pipe branched from the first pipe, a drain connected to the third pipe, a sensor module connected to the second pipe, the sensor module including an inlet valve connected to the second pipe, an outlet valve connected to the drain, and a sensor housing including a chamber configured to receive a chemical liquid therein, a fourth pipe connected to the outlet valve and the drain, and a pH sensor releasably mounted to the sensor housing. The sensor module may be disposed in parallel to the third pipe. The sensor housing may include an inlet formed at the chamber, an upper outlet under the inlet, and a lower outlet under the upper outlet. The inlet may be connected to the inlet valve, and the lower outlet may be connected to the outlet valve.

DETAILED DESCRIPTION OF EXAMPLE EMBODIMENTS

Figure 1:
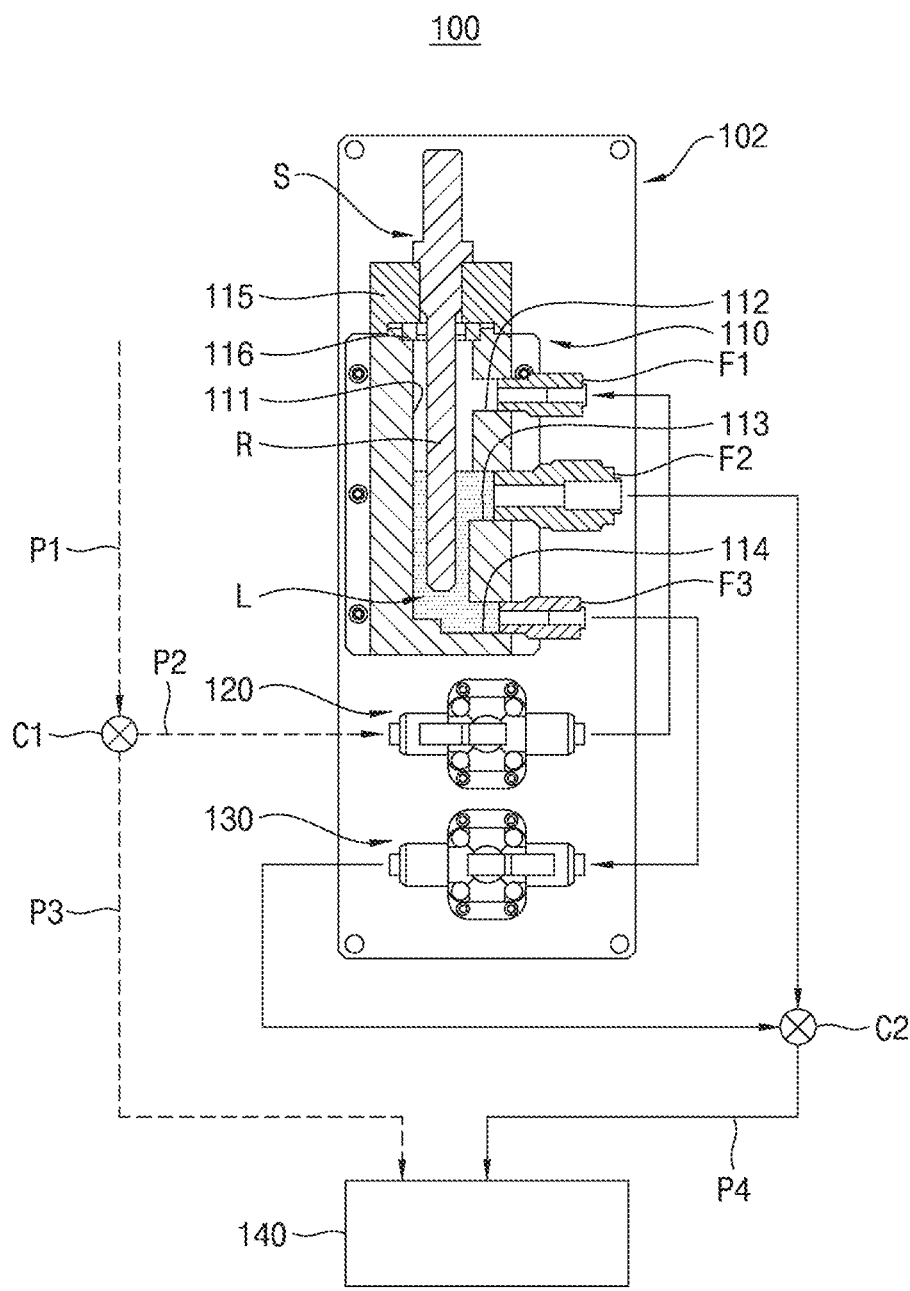
FIG. 1 is a schematic view of a sensor module according to an exemplary embodiment of the disclosure.
Figure 2:
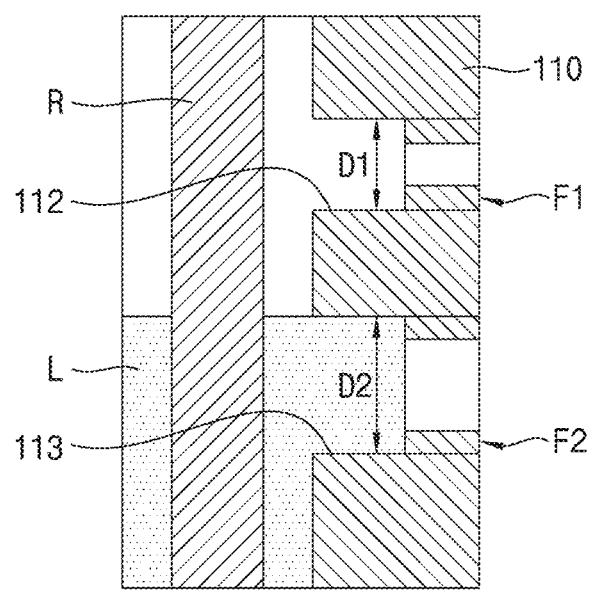
FIG. 2 is an enlarged cross-sectional view of a portion of the sensor module shown in FIG. 1.
Figure 3:
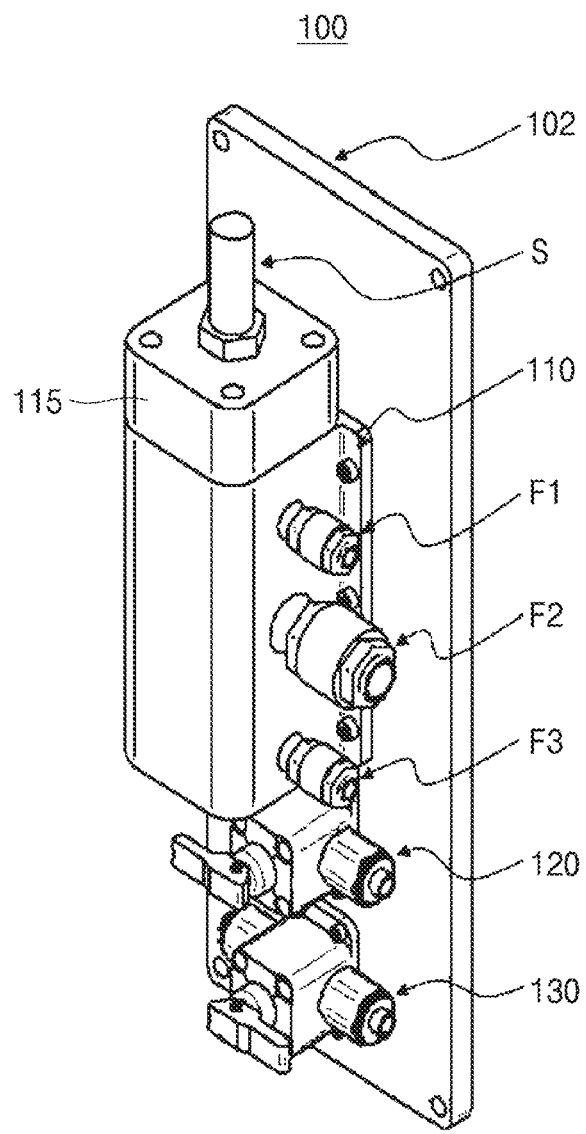
FIG. 3 is a perspective view of the sensor module shown in FIG. 1.

FIG. 1 is a schematic view of a sensor module according to some example embodiments of the disclosure. FIG. 2 is an enlarged cross-sectional view of a portion of the sensor module shown in FIG. 1. FIG. 3 is a perspective view of the sensor module shown in FIG. 1.

Referring to FIGS. 1 to 3, a sensor module 100 according to some example embodiments of the disclosure may be used to measure a pH of a chemical liquid flowing through piping, and may be disposed in parallel to a pipe connected to a drain 140. In an embodiment, a first pipe P1 may be branched into a second pipe P2 and a third pipe P3, and the third pipe P3 may be connected to the drain 140. A first connection member C1 interconnecting the first pipe P1, the second pipe P2 and the third pipe P3 may be disposed thereamong. Other pipes connected to the sensor module 100 may be connected to a second connection member C2. A fourth pipe P4 may interconnect the second connection member C2 and the drain 140. The first connection member C1 and the second connection member C2 may each interconnect adjacent pipes, and may each be a valve or a fitting.

In an embodiment, the sensor module 100 may include a mount panel 102, a sensor housing 110, an inlet valve 120, and an outlet valve 130. The sensor housing 110 may be installed in a state of being fixed to the mount panel 102, and may accommodate a pH sensor S therein. The inlet valve 120 may be connected to the second pipe P2, and may provide a chemical liquid L to the sensor housing 110. The outlet valve 130 may be connected to the second connection member C2, and may discharge the chemical liquid L in the sensor housing 110.

The sensor housing 110 may include a chamber 111, an inlet 112, an upper outlet 113, a lower outlet 114, a cap 115, and a lip seal structure 116. The chamber 111 may be formed in an interior of the sensor housing 110, and may accommodate the chemical liquid L and the pH sensor S therein. For example, when the pH sensor S is mounted to the sensor housing 110, a rod R of the pH sensor S may be disposed within the chamber 111. In the chamber 111, the inlet 112, the upper outlet 113 and the lower outlet 114 may be formed. In an embodiment, the upper outlet 113 may be disposed at a lower level than the inlet 112. The lower outlet 114 may be disposed at a lower level than the inlet 112. In an embodiment, a bottom surface of the lower outlet 114 may be disposed at a lower level than a bottom surface of the chamber 111. Accordingly, after pH measurement, the chemical liquid L may be discharged without remaining in the chamber 111. In some embodiments, the bottom surface of the lower outlet 114 may be disposed at the same level as the bottom surface of the chamber 111. The inlet 112, the upper outlet 113 and the lower outlet 114 may extend from an inner wall of the chamber 111 to an outer wall of the sensor housing 110, and may allow the chamber 111 to communicate with an exterior of the sensor housing 110.

For example, the sensor module 100 may further include an upper fitting F1, a middle fitting F2 and a lower fitting F3 respectively connected to the inlet 112, the upper outlet 113 and the lower outlet 114. The upper fitting F1 may be fastened to the inlet 112, and a portion of the upper fitting F1 may be disposed in the inlet 112. The upper fitting F1 may be connected to the inlet valve 120, and may be used to provide the chemical liquid L to an interior of the chamber 111. The middle fitting F2 may be fastened to the upper outlet 113, and a portion of the middle fitting F2 may be disposed in the upper outlet 113. The middle fitting F2 may be connected to the second connection member C2, and may be used to discharge the chemical liquid L in the chamber 111. The lower fitting F3 may be fastened to the lower outlet 114, and a portion of the lower fitting F3 may be disposed in the lower outlet 114. The lower fitting F3 may be connected to the outlet valve 130, and may be used to discharge the chemical liquid L in the chamber 111. In an embodiment, the upper fitting F1, the middle fitting F2 and the lower fitting F3 may be connected to the inlet valve 120, the second connection member C2 and the outlet valve 130 by pipes corresponding thereto, respectively.

Further referring to FIG. 2, the chemical liquid L may be received in the chamber 111 such that a lower portion of the rod R of the pH sensor S is dipped therein. Before and during pH measurement, the chemical liquid L may be provided to the interior of the chamber 111 through the inlet 112, and may be discharged through the upper outlet 113. Accordingly, the liquid level of the chemical liquid L provided to the interior of the chamber 111 through the inlet 112 may not be higher than the level of the upper outlet 113. For example, the liquid level of the chemical liquid L may be equal to or lower than the level of a top surface of the upper outlet 113. Since the chemical liquid L is discharged through the upper outlet 113, the chemical liquid L remaining in the chamber 111 during pH measurement may be maintained in a constant amount. In an embodiment, the inlet 112 may have a greater size than the upper outlet 113 in order to achieve easy discharge of the chemical liquid L. For example, a diameter D2 of the upper outlet 113 may be greater than a diameter D1 of the inlet 112. In addition, the middle fitting F2 may have a greater diameter than the upper fitting F1. The upper outlet 113 may be connected to the second connection member C2 under the condition that no valve is connected therebetween, in order to achieve easy discharge of the chemical liquid L. Although the lower outlet 114 is shown in FIG. 1 as having the same size as the inlet 112, the exemplary embodiments of the disclosure are not limited thereto. For example, the lower outlet 114 may have a greater or smaller size than the inlet 112.

The cap 115 may be disposed over the sensor housing 110. The cap 115 may include an opening in order to allow the pH sensor S to be mounted to the sensor housing 110. The pH sensor S may be mounted to or separated from the sensor housing 110 through downward or upward movement thereof. The cap 115 may be separable from the sensor housing 110.

Figure 4A:
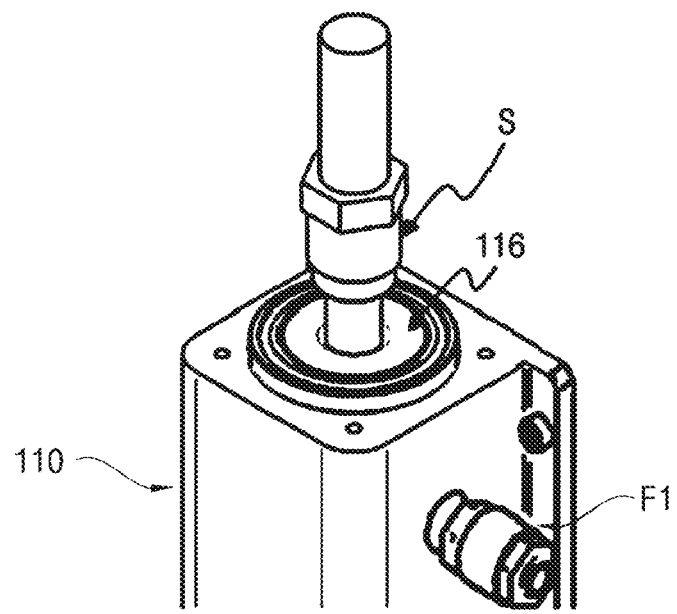
FIG. 4A is a perspective view of a lip seal structure according to an exemplary embodiment of the disclosure.
Figure 4B:
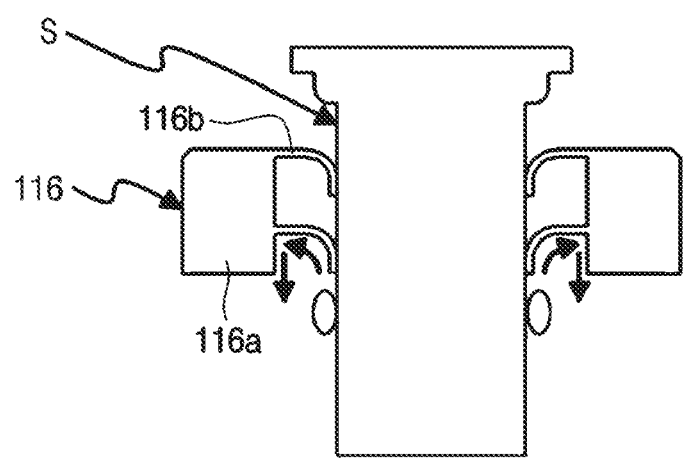
FIG. 4B is a vertical sectional view of the lip seal structure shown in FIG. 4A.

FIG. 4A is a perspective view of a configuration of the lip seal structure according to an exemplary embodiment of the disclosure. FIG. 4A shows the sensor housing, from which the cap is separated, and the lip seal structure. FIG. 4B is a vertical sectional view of the lip seal structure shown in FIG. 4A.

Referring to FIGS. 1, 4A, and 4B, the lip seal structure 116 may be disposed under the cap 115 and, for example, may be disposed to contact a bottom surface of the cap 115. The lip seal structure 116 may also contact the rod R of the pH sensor S. The lip seal structure 116 may include a body portion 116a, and at least one sealing portion 116b horizontally extending from the body portion 116a. Although two sealing portions 116b are shown in FIG. 4B, the exemplary embodiments of the disclosure are not limited thereto. The lip seal structure 116 may be disposed to extend along a circumference of the rod R of the pH sensor S and, for example, may have a ring or donut shape. For example, the body portion 116a and the sealing portion 116b of the lip seal structure 116 may extend along the circumference of the rod R of the pH sensor S. The body portion 116a may be disposed to contact an inner wall of the sensor housing 110 and the cap 115, and the sealing portion 116b may extend inwards toward a center of the body portion 116a such that the sealing portion 116b contacts the rod R of the pH sensor S. A portion of the sealing portion 116b contacting the rod R of the pH sensor S may tightly contact a surface of the rod R. Accordingly, when the pH sensor S is separated, the chemical liquid L present on the surface of the rod R may be prevented or reduced from being outwardly scattered and may return to the interior of the chamber 111.

The inlet valve 120 may be installed in a state of being fixed to the mount panel 102. The inlet valve 120 may be connected to the upper fitting F1 via a pipe, and may be connected to the second pipe P2. Before and during pH measurement, the inlet valve 120 may be opened and, as such, a portion of the chemical liquid L flowing through the first pipe P1 may be provided to the interior of the chamber 111 via the second pipe P2, the inlet valve 120 and the upper fitting F1. After pH measurement, the inlet valve 120 may be closed. Although the inlet valve 120 is shown in FIG. 1 as being disposed under the sensor housing 110, the example embodiments of the disclosure are not limited thereto. In some embodiments, the inlet valve 120 may be disposed at a right or left side of the sensor housing 110.

The outlet valve 130 may be installed in a state of being fixed to the mount panel 102. The outlet valve 130 may be connected to the lower fitting F3 via a pipe, and may be connected to the second connection member C2. After pH measurement, the outlet valve 130 may be opened and, as such, the chemical liquid L in the chamber 111 may be discharged to the drain 140 via the outlet valve 130 and the second connection member C2. Although the outlet valve 130 is shown in FIG. 1 as being disposed under the sensor housing 110 and the inlet valve 120, the example embodiments of the disclosure are not limited thereto. In some embodiments, the outlet valve 130 may be disposed at the right or left side of the sensor housing or on the inlet valve 120.

The drain 140 may be connected to the third pipe P3 and the fourth pipe P4. The drain 140 may store the chemical liquid L flowing through the first pipe P1 and the third pipe P3, and may store the chemical liquid L discharged from the sensor module 100. In a substrate processing process, the chemical liquid L remaining in a mixer, which will be described later, may be discharged to the drain 140 via the first pipe P1 and the third pipe P3. Otherwise, a neutralization liquid, such as deionized water (DIW), for neutralizing an interior of the mixer may be discharged to the drain 140.

As shown in FIG. 1, the sensor module 100 may be connected, in parallel, to the third pipe P3, which is a pipe extending to the drain 140. For example, the sensor module 100 may be connected to the second pipe P2 which is branched from the first pipe P1. In accordance with this configuration, it may be possible to perform pH measurement without causing interference with flow of the chemical liquid or the neutralization liquid discharged to the drain 140. Accordingly, pH measurement may be achieved without causing delay of a manufacturing process. In addition, pH measurement may be achieved by mounting the pH sensor S to the sensor module 100 without requiring the user to directly sample the chemical liquid L and, as such, a safety incident caused by scattering of the chemical liquid or the like may be prevented or reduced. Since the sensor module 100 includes, therein, the chamber 111 receiving the chemical liquid, and the chemical liquid is introduced into and discharged from the chamber 111 not only before pH measure, but also during pH measurement, pH measurement in real time may be possible.

Figure 5:
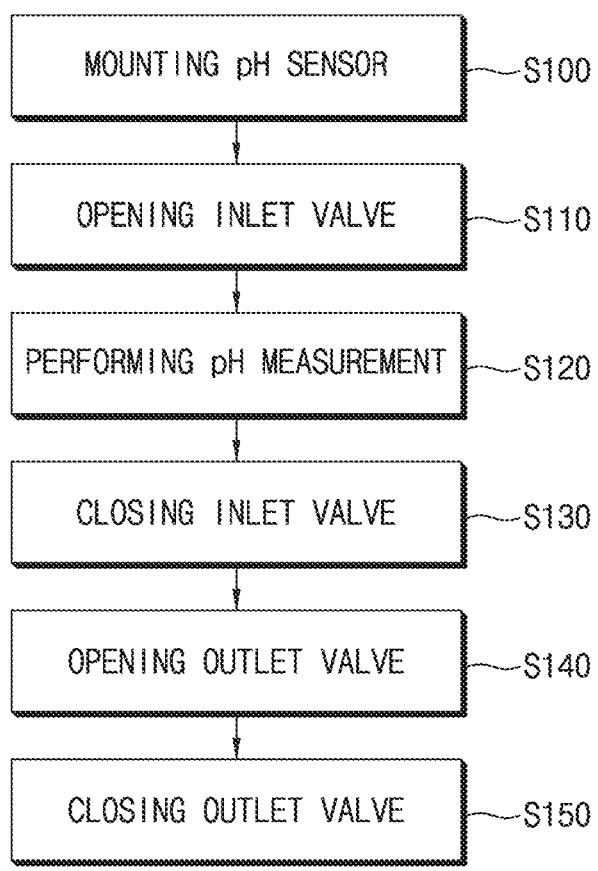
FIG. 5 is a flowchart of a pH measurement method according to an exemplary embodiment of the disclosure.

FIG. 5 is a flowchart of a pH measurement method according to an example embodiment of the disclosure.

Referring to FIG. 5, the pH measurement method may include mounting a pH sensor S (S100), opening an inlet valve 120 (S110), performing pH measurement (S120), closing the inlet valve 120 (S130), opening an outlet valve 130 (S140), and closing the outlet valve 130 (S150).

Mounting the pH sensor S (S100) may include mounting the pH sensor S to the sensor housing 110. A rod R of the pH sensor S may be inserted into a chamber 111 through a cap 115 disposed over the sensor housing 110.

Before pH measurement, the inlet valve 120 may be opened and, as such, a chemical liquid L may be introduced into the chamber 111. For example, a portion of the chemical liquid L flowing through the first pipe P1 may be provided to an interior of the chamber 111 via a second pipe P2, an inlet valve 120 and an upper fitting F1. Although the upper fitting F1 is disposed at a higher level than the inlet valve 120, the chemical liquid L may be provided from the first pipe P1 to the interior of the chamber 111 without use of a separate pump, by virtue of the pressure of the chemical liquid L flowing through the first pipe P1. Alternatively, in some embodiments, a sensor module 100 may further include a pump disposed between a first connection member C1 and the upper fitting F1. A neutralization liquid for neutralizing the chemical liquid L may also be provided to the interior of the chamber 111. For example, the neutralization liquid may be discharged to the drain 140 via the first pipe P1 and the third pipe P3, and a portion thereof may be provided to the interior of the chamber 111 in accordance with opening of the inlet valve 120. The inlet valve 120, which is opened before pH measurement, may be maintained in an opened state even during pH measurement. When the inlet valve 120 is opened, the outlet valve 130 may be in a closed state.

At least a portion of the rod R of the pH sensor S may be dipped in the chemical liquid L and, as such, pH measurement may be performed for the chemical liquid L provided to the interior of the chamber 111 (S120). Since the inlet valve 120 is in an opened state even during pH measurement, the chemical liquid L may be continuously provided to the interior of the chamber 111, and a portion of the chemical liquid L may be discharged to the drain 140 via a second connection member C2 and a fourth pipe P4 by an upper outlet 113. Accordingly, the chemical liquid L may be maintained at a constant liquid level and, as such, the amount of the measured chemical liquid L may be constant. The liquid level of the chemical liquid L may be maintained to be lower than the level of a bottom surface of an inlet 112 and, for example, may be maintained to be equal to or lower than the level of a top surface of the upper outlet 113. pH measurement may be continuously performed in the opened state of the inlet valve 120, and the pH sensor S may measure a pH value of the chemical liquid L in the chamber 111 in real time. In an embodiment, the measured pH value may be displayed by a display device 50, which will be described later, connected to the pH sensor S.

When the measured pH value satisfies a predetermined or desired range or satisfies a predetermined or desired range for a predetermined or desired period of time, pH measurement may be ended. After ending pH measurement, the inlet valve 120 may be closed (S130). After closing of the inlet valve 120, a portion of the chemical liquid L in the chamber 111 may be discharged through the upper outlet 113, and a portion of the chemical liquid L may remain in the chamber 111.

Thereafter, the outlet valve 130 may be opened (S140). In accordance with opening of the outlet valve 130, the chemical liquid L remaining in the chamber 111 may be discharged through a lower fitting F3. A bottom surface of a lower outlet 114 may be coplanar with a bottom surface of the chamber 111 or may be disposed at a lower level than the bottom surface of the chamber 111. Accordingly, the chemical liquid L may be completely discharged without remaining in the chamber 111.

After discharge of the chemical liquid L, the outlet valve 130 may be closed (S150). After completion of pH measurement, the pH sensor S may be separated from the sensor housing 110.

Figure 6:
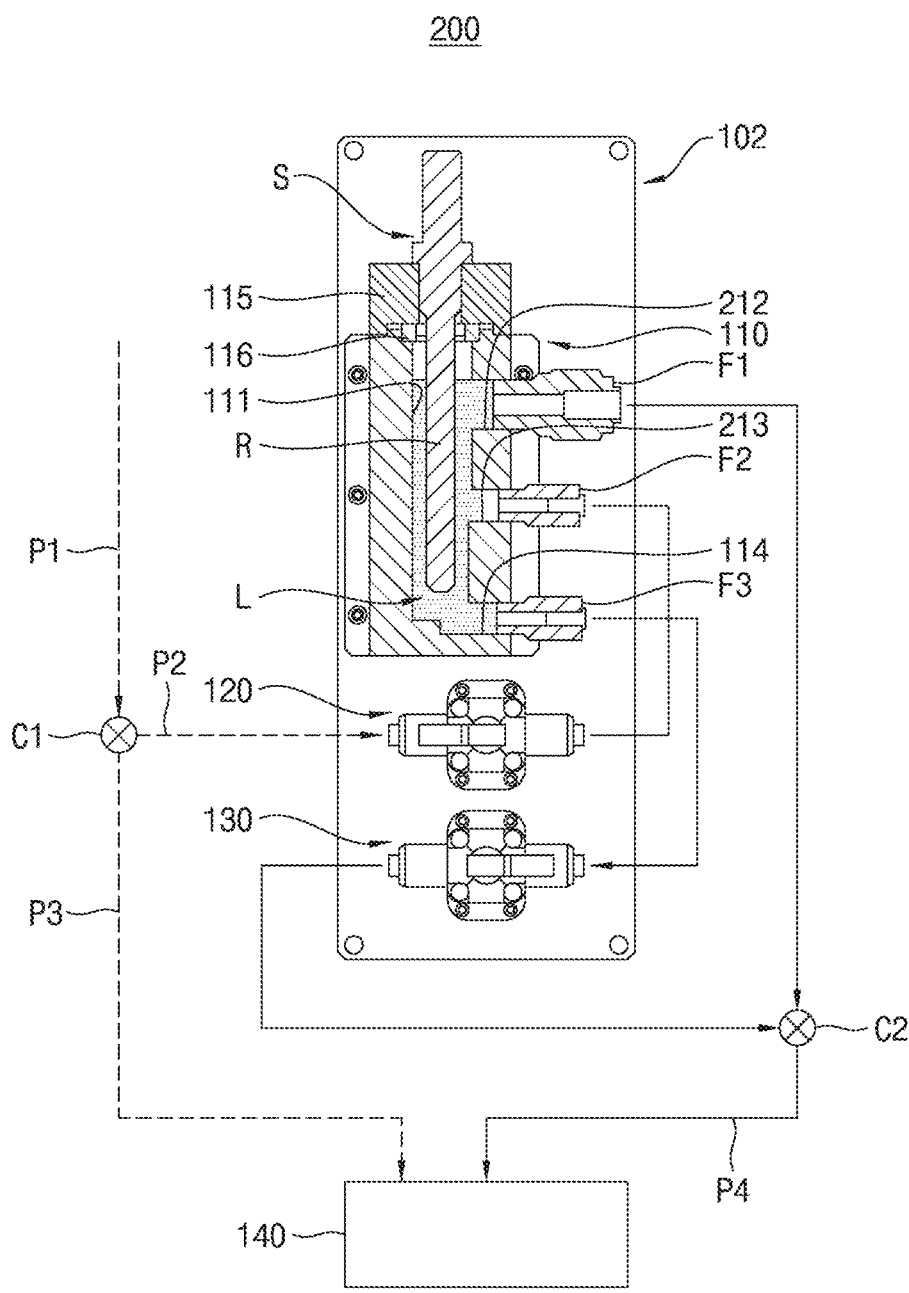
FIGS. 6 and 7 are schematic views of sensor modules according to exemplary embodiments of the disclosure, respectively.
Figure 7:
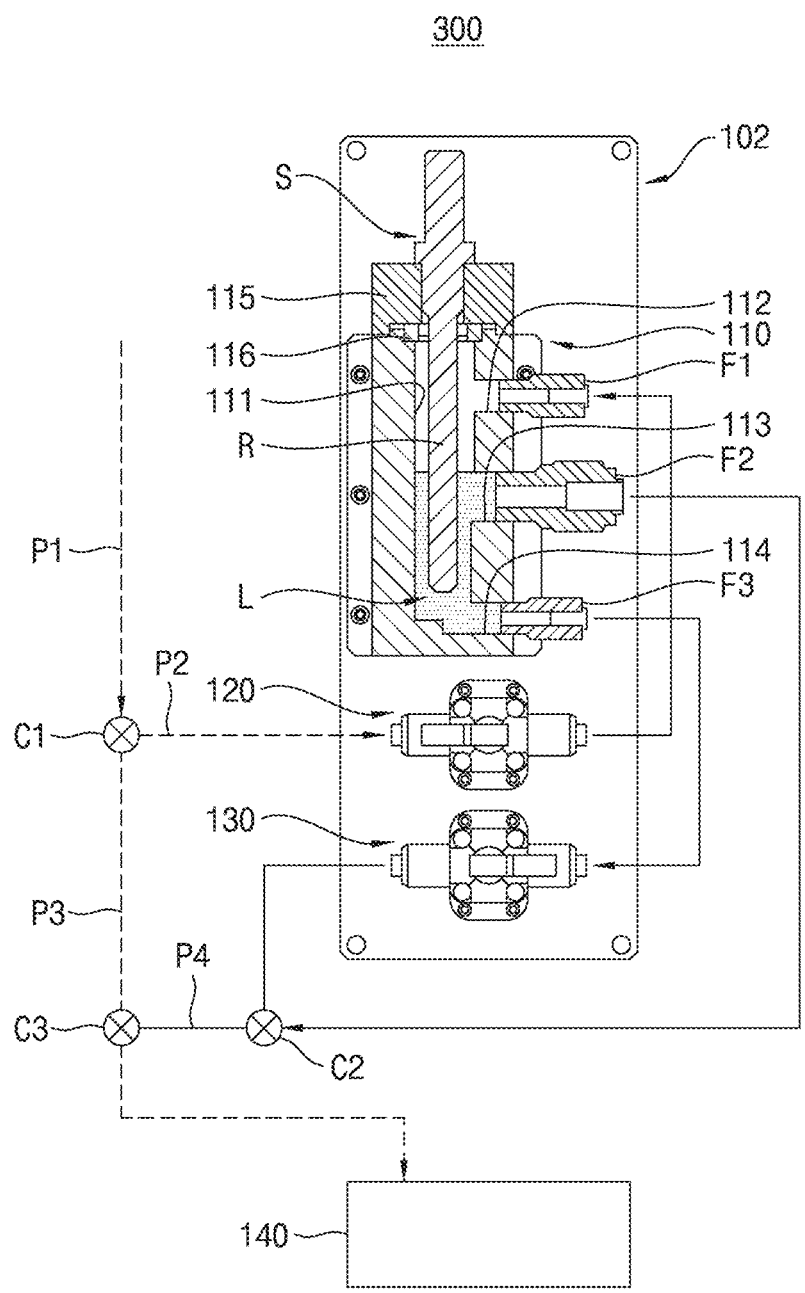

FIGS. 6 and 7 are plan views of sensor modules according to exemplary embodiments of the disclosure, respectively.

Referring to FIG. 6, a sensor housing 110 of a sensor module 200 may include a configuration identical or similar to the sensor housing 110 shown in FIG. 1, except for an inlet 213, an upper outlet 212, an upper fitting F1 and a middle fitting F2. In an embodiment, the middle fitting F2 may be connected to an inlet valve 120, and the upper fitting F1 may be connected to a second connection member C2. For example, the inlet 213 may be disposed below the upper outlet 212, and the middle fitting F2 may be fastened to the inlet 213. The upper fitting F1 may be fastened to the upper outlet 212. A chemical liquid L may be provided to an interior of a chamber 111 via a second pipe P2, the inlet valve 120 and the middle fitting F2. The chemical liquid L provided to the interior of the chamber 111 may be discharged to a drain 140 via the upper fitting F1, the second connection member C2 and a fourth pipe P4. Since the inlet 213 is disposed below the upper outlet 212, the inlet 213 may be dipped in the chemical liquid L upon pH measurement. For example, the liquid level of the chemical liquid L may be maintained at a level higher than the level of a top surface of the inlet 213 and, for example, may be equal to or lower than the level of a top surface of the upper outlet 212. In an embodiment, the upper outlet 212 may have a greater size than the inlet 213 in order to achieve easy discharge of the chemical liquid L. For example, the upper fitting F1 may have a greater diameter than the middle fitting F2. In an embodiment, a pump may be provided between second connection member C2 and the middle fitting F2 in order to prevent or reduce the chemical liquid L provided from the inlet 213 from flowing backwards. Of course, the exemplary embodiments of the disclosure are not limited to the above-described condition.

Referring to FIG. 7, a fourth pipe P4, which discharges a chemical liquid L from a sensor module 300, may be connected to a third pipe P3. For example, the third pipe P3 and the fourth pipe P4 may be interconnected by a third connection member C3. Accordingly, a portion of a chemical liquid L flowing through a first pipe P1 may be mixed with a chemical liquid L flowing through the third pipe P3 via a second line P2, the sensor module 300 and the fourth pipe P4, and may then be discharged to a drain 140. Even in the case of the sensor module 300 shown in FIG. 7, the sensor module 300 may be disposed in parallel to the third pipe P3 and, as such, it may be possible to perform pH measurement without causing interference with flow of a chemical liquid discharged to the drain 140.

Figure 8:
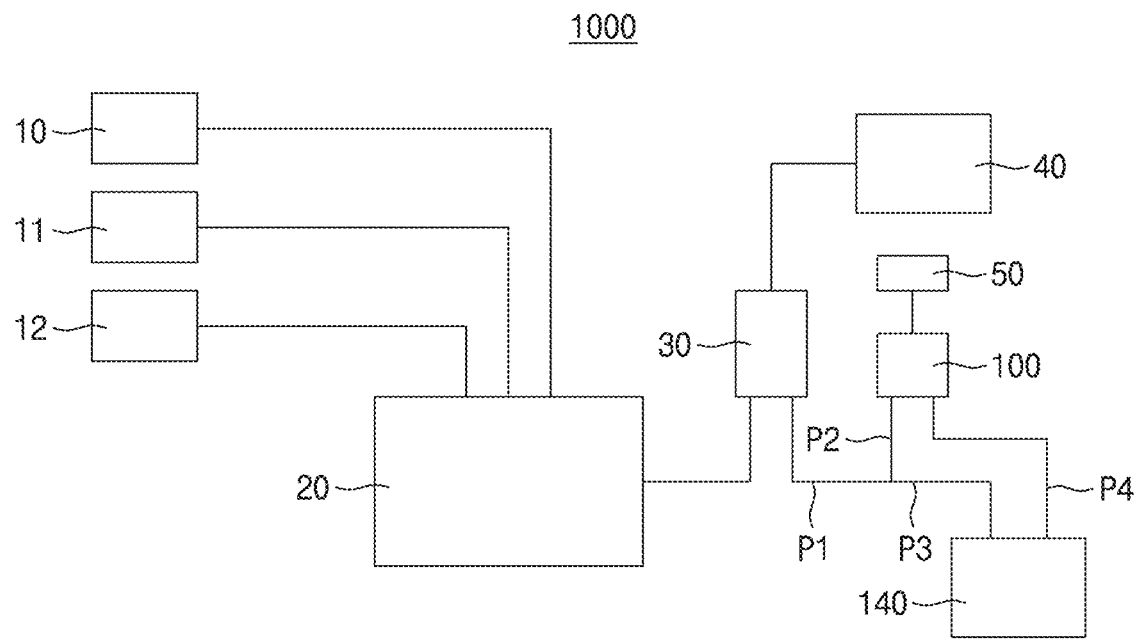
FIG. 8 is a block diagram of a pH monitoring system according to an exemplary embodiment of the disclosure.

FIG. 8 is a block diagram of a pH monitoring system according to an example embodiment of the disclosure.

Referring to FIG. 8, a pH monitoring system 1000 may include chemical liquid supply sources 10, 11 and 12, a mixer 20, a pump 30, a substrate processing apparatus 40, a sensor module 100, and a drain 140. The sensor module 100 and the drain 140 may include configurations identical or similar to those shown in FIG. 1, 7 or 8, respectively.

The chemical liquid supply sources 10, 11 and 12 may be connected to the mixer 20 by pipes corresponding thereto, respectively. At least one of the chemical liquid supply sources 10, 11 and 12 may provide a chemical liquid to the mixer 20, and chemical liquids provided in the above-described manner may be mixed in the mixer 20 and may then be provided to the substrate processing apparatus 40. Kinds and a mixture ratio of chemical liquids to be mixed may be varied in accordance with the kind of the substrate processing apparatus 40 and the type of a process.

The pump 30 may be disposed between the mixer 20 and the substrate processing apparatus 40. The pump 30 may receive a mixed chemical liquid from the mixer 20, and may then transfer the mixed chemical liquid to the substrate processing apparatus 40. The pump 30 may also be connected to the drain 140, and a chemical liquid remaining in the mixer 20 may be discharged to the drain 140. When process equipment checking or the like is required or desirable, a neutralization liquid may be discharged together with the chemical liquid after passing through the mixer 20. As described with reference to FIG. 1, the chemical liquid and the neutralization liquid may be discharged to the drain 140 via a first pipe P1 and a third pipe P3, and the sensor module 100, which is connected to the third pipe P3 in parallel, may measure a pH of the chemical liquid. In an embodiment, the chemical liquid may be discharged through a fourth pipe P4 directly interconnecting the sensor module 100 and the drain 140. In an embodiment, the pump 30 may be a constituent element of the mixer 20.

In an embodiment, the pH monitoring system 1000 may further include a display device 50 connected to the sensor module 100. For example, the display device 50 may be connected to a pH sensor S, and may display, in real time, a pH value measured by the pH sensor S.

FIGS. 9 to 12 are block diagrams of pH monitoring systems according to exemplary embodiments of the disclosure.

Figure 9:
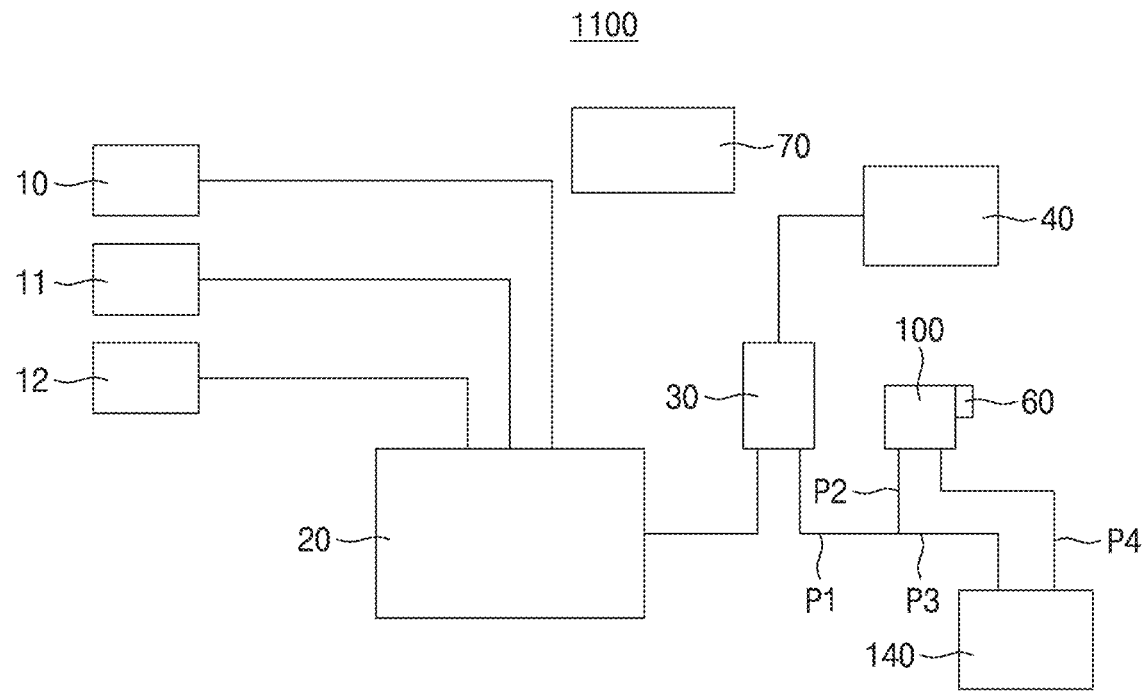
FIGS. 9 to 12 are block diagrams of pH monitoring systems according to exemplary embodiments of the disclosure.

Referring to FIG. 9, in an embodiment, a pH monitoring system 1100 may include a communication device 60, and a server 70 connected to the communication device 60 such that the server 70 may communicate with the communication device 60. The communication device 60 may be included in the sensor module 100, and may be connected to the pH sensor S. The communication device 60 may transmit a measured pH value to the server 70 in a wired or wireless manner. The communication device 60 may also transmit the measured pH value to the server 70 in real time.

Figure 10:
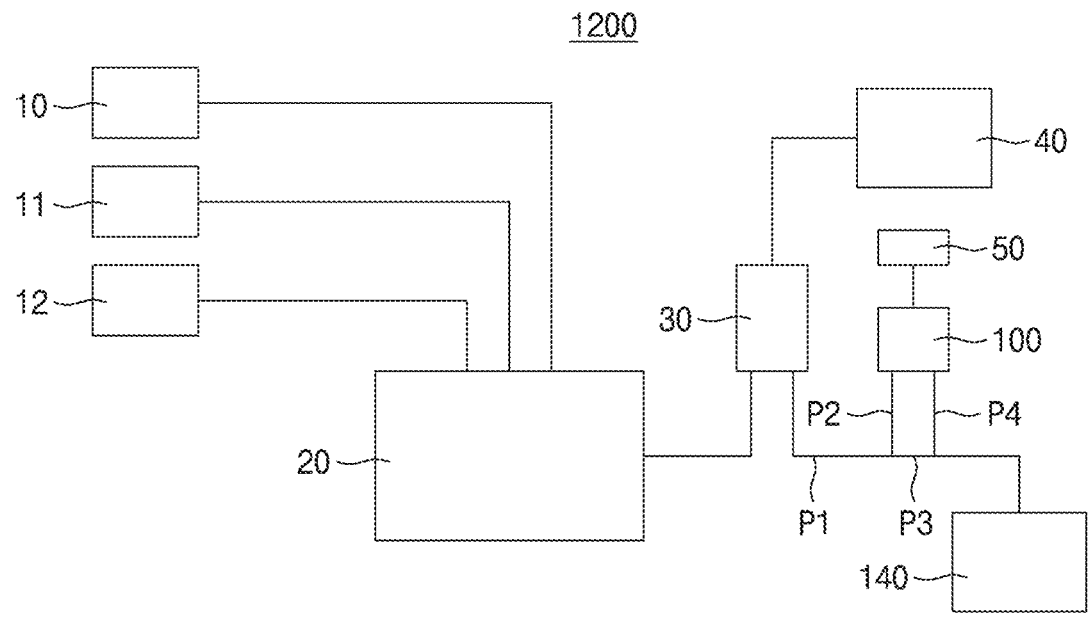

Referring to FIG. 10, a pH monitoring system 1200 may include a second pipe P2 and a fourth pipe P4 connected to the sensor module 100. In an embodiment, the fourth pipe P4 may be connected to a third pipe P3, and may not be directly connected to a drain 140. The third pipe P3 and the fourth pipe P4 may be interconnected through the same method as the method shown in FIG. 7.

Figure 11:
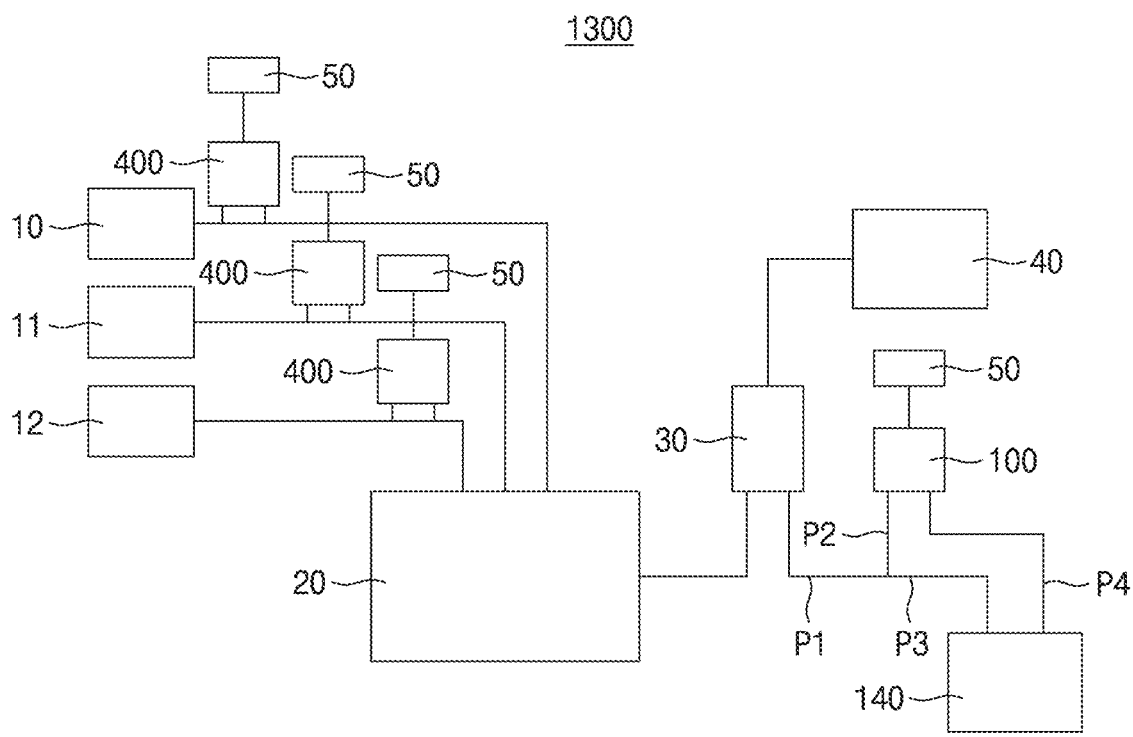

Referring to FIG. 11, a pH monitoring system 1300 may include sensor modules 400 respectively connected, in parallel, to pipes connecting chemical supply sources 10, 11 and 12 to a mixer 20. The sensor modules 400 may include a configuration identical or similar to the configuration shown in FIG. 1, 7 or 8. Each sensor module 400 may measure a pH of a chemical liquid provided to a mixer 20 from a corresponding one of chemical liquid supply sources 10, 11 and 12. In an embodiment, the pH monitoring system 1300 may include display devices 50 respectively connected to the sensor modules 400. The display devices 50 may display, in real time, pH values measured by the sensor modules 400, respectively.

Figure 12:
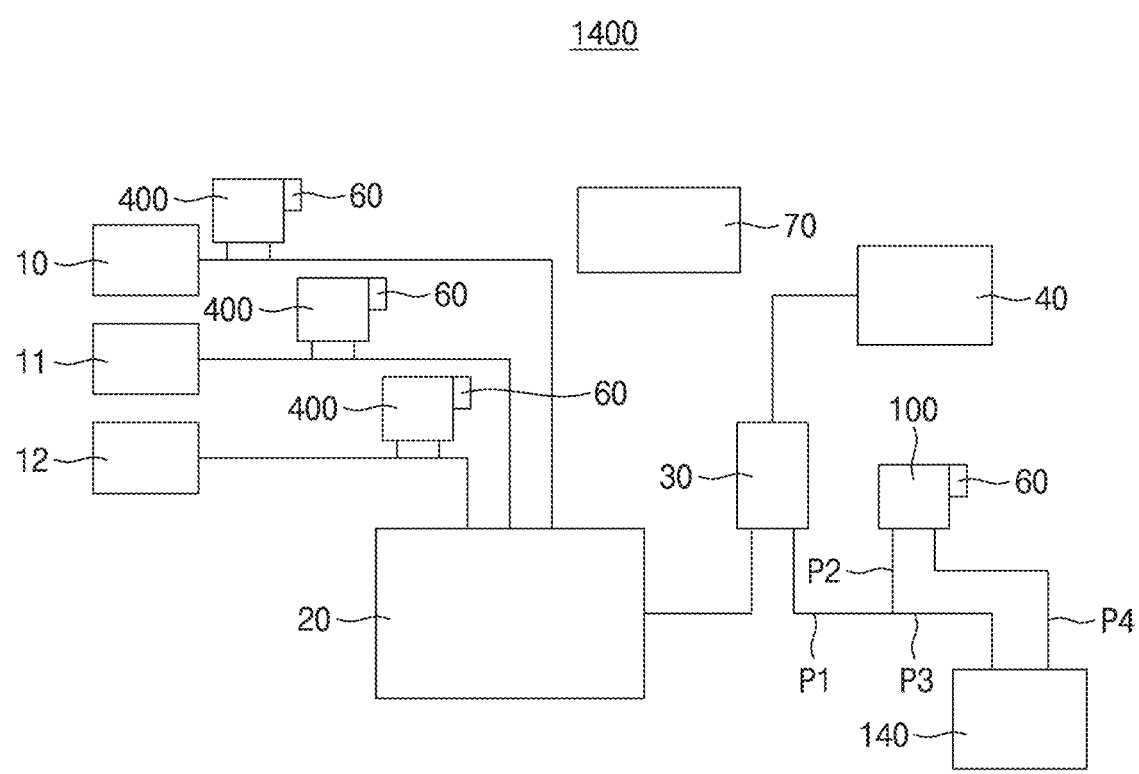

Referring to FIG. 12, a pH monitoring system 1400 may include a configuration identical or similar to the pH monitoring system 1300 shown in FIG. 11, except that the pH monitoring system 1400 includes a communication device 60 and a server 70. pH values measured by sensor modules 400 may be transmitted to the server 70 via communication devices 60, respectively.

In accordance with the example embodiments of the disclosure, a sensor module may be disposed in parallel to a pipe connected to a drain and, as such, pH measurement may be performed without causing interference with flow of a chemical liquid and may be more safely performed.

As described herein, any devices, electronic devices, modules, units, and/or portions thereof according to any of the example embodiments, and/or any portions thereof (including, without limitation, the sensor module 100, 200, 300, 400 or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Any of the memories described herein, may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM).

While the embodiments of the disclosure have been described with reference to the accompanying drawings, it should be understood by those skilled in the art that various modifications may be made without departing from the scope of the disclosure and without changing essential features thereof. Therefore, the above-described embodiments should be considered in a descriptive sense only and not for purposes of limitation.

What is claimed is:

1. A pH monitoring system comprising:
a first pipe;
a second pipe and a third pipe branched from the first pipe;
a drain connected to the third pipe;
a sensor module connected to the second pipe, the sensor module comprising an inlet valve connected to the second pipe, an outlet valve connected to the drain, and a sensor housing comprising a chamber configured to receive a chemical liquid therein; and
a pH sensor removably mounted to the sensor housing, wherein
the sensor module is disposed in parallel to the third pipe,
the sensor housing further includes an inlet, an upper outlet and a lower outlet formed at the chamber,
the inlet is connected to the inlet valve, and
the lower outlet is connected to the outlet valve.

2. The pH monitoring system according to claim 1, wherein the upper outlet has a greater diameter than the inlet.

3. The pH monitoring system according to claim 1, wherein the chemical liquid introduced into the chamber through the inlet upon pH measurement is discharged through the upper outlet.

4. The pH monitoring system according to claim 1, wherein, upon pH measurement, a liquid level of the chemical liquid is equal to or lower than a level of a top surface of the upper outlet.

5. The pH monitoring system according to claim 1, wherein a bottom surface of the lower outlet is disposed at a level equal to or lower than a level of a bottom surface of the chamber.

6. The pH monitoring system according to claim 1, wherein the sensor module further comprises:
an upper fitting fastened to the inlet;
a middle fitting fastened to the upper outlet; and
a lower fitting fastened to the lower outlet.

7. The pH monitoring system according to claim 1, wherein the inlet is disposed vertically above the upper outlet.

8. The pH monitoring system according to claim 1, wherein the upper outlet is disposed vertically above the inlet.

9. The pH monitoring system according to claim 1, further comprising:
a lip seal structure disposed at an upper portion of the sensor housing along a circumference of a rod of the pH sensor.

10. The pH monitoring system according to claim 9, wherein the lip seal structure comprises a body portion fixed to the sensor housing, and a sealing portion extending from the body portion and contacting the rod of the pH sensor.

11. The pH monitoring system according to claim 1, further comprising:
a fourth pipe connected to the outlet valve,
wherein the fourth pipe is directly connected to the drain.

12. The pH monitoring system according to claim 1, further comprising:
a fourth pipe connected to the outlet valve,
wherein the fourth pipe is connected to the drain via the third pipe.

13. The pH monitoring system according to claim 12, wherein portions of the chemical liquid and a neutralization liquid flowing through the first pipe are provided to the sensor module via the second pipe.

14. A pH monitoring system comprising:
at least one chemical liquid supply source;
a mixer connected to the chemical liquid supply source;
a pump connected to the mixer;
a substrate processing apparatus connected to the pump;
a first pipe connected to the pump;
a second pipe and a third pipe branched from the first pipe;
a drain connected to the third pipe;
a first sensor module connected to the second pipe, the first sensor module comprising an inlet valve connected to the second pipe, an outlet valve connected to the drain, and a sensor housing comprising a chamber configured to receive a chemical liquid therein; and
a pH sensor removably mounted to the sensor housing, wherein
the first sensor module is disposed in parallel to the third pipe,
the sensor housing comprises an inlet, an upper outlet and a lower outlet formed at the chamber,
the inlet is connected to the inlet valve, and
the lower outlet is connected to the outlet valve.

15. The pH monitoring system according to claim 14, further comprising:
a display device connected to the pH sensor,
wherein the display device is configured to display, in real time, a pH value measured by the pH sensor.

16. The pH monitoring system according to claim 14, further comprising:
a second sensor module disposed in parallel to at least one of pipes between the at least one chemical liquid supply source and the mixer.

17. The pH monitoring system according to claim 14, further comprising:
a server configured to receive a pH value measured by the pH sensor,
wherein the first sensor module further comprises a communication device connected to the server, to communicate with the server and to transmit the pH value.

18. The pH monitoring system according to claim 17, further comprising:

a second sensor module disposed in parallel to at least one of pipes between the at least one chemical liquid supply source and the mixer.

19. A pH monitoring system comprising:
a first pipe;
a second pipe and a third pipe branched from the first pipe;
a drain connected to the third pipe;
a sensor module connected to the second pipe, the sensor module comprising an inlet valve connected to the second pipe, an outlet valve connected to the drain, and a sensor housing comprising a chamber configured to receive a chemical liquid therein;
a fourth pipe connected to the outlet valve and the drain; and
a pH sensor removably mounted to the sensor housing,
wherein the sensor module is disposed in parallel to the third pipe,
wherein the sensor housing comprises an inlet formed at the chamber, an upper outlet vertically under the inlet, and a lower outlet vertically under the upper outlet,
wherein the inlet is connected to the inlet valve, and the lower outlet is connected to the outlet valve.

* * * * *